US012620917B2

(12) United States Patent
Guillaume et al.

(10) Patent No.: US 12,620,917 B2
(45) Date of Patent: May 5, 2026

(54) WATER TURBINE POWER GENERATION SYSTEM AND CONTROL METHOD FOR PROVIDING IMPROVED DYNAMIC RESPONSE TO MAJOR POWER SETPOINT VARIATIONS

(71) Applicant: SUPERGRID INSTITUTE, Villeurbanne (FR)

(72) Inventors: Renaud Guillaume, Lyons (FR); Hugo Mesnage, Lyons (FR)

(73) Assignee: SUPERGRID INSTITUTE (FR)

( * ) Notice: Subject to any disclaimer, the term of this patent is extended or adjusted under 35 U.S.C. 154(b) by 360 days.

(21) Appl. No.: 18/263,321

(22) PCT Filed: Jan. 31, 2022

(86) PCT No.: PCT/EP2022/052233
§ 371 (c)(1),
(2) Date: Jul. 27, 2023

(87) PCT Pub. No.: WO2022/162227
PCT Pub. Date: Aug. 4, 2022

(65) Prior Publication Data
US 2024/0097587 A1 Mar. 21, 2024

(30) Foreign Application Priority Data

Feb. 1, 2021 (FR) ........................................ 2100947
Jan. 25, 2022 (FR) ........................................ 2200640

(51) Int. Cl.
*H02P 9/02* (2006.01)
*H02K 7/18* (2006.01)

(52) U.S. Cl.
CPC ............. *H02P 9/02* (2013.01); *H02K 7/1823* (2013.01)

(58) Field of Classification Search
CPC ...... H02J 3/24; H02J 3/381; H02J 3/16; H02J 3/18; H02J 3/12; H02J 2203/10; G06Q 50/06
See application file for complete search history.

(56) References Cited

U.S. PATENT DOCUMENTS

| | | | | |
|---|---|---|---|---|
| 2012/0296482 A1* | 11/2012 | Steven | .................. | G06Q 40/04 700/291 |
| 2013/0090774 A1* | 4/2013 | Kalich | .................. | G06Q 10/04 700/287 |

(Continued)

FOREIGN PATENT DOCUMENTS

| | | |
|---|---|---|
| CN | 111900721 A | 11/2020 |
| EP | 3703213 A1 | 9/2020 |
| WO | 2022162227 A1 | 8/2022 |

OTHER PUBLICATIONS

International Search Report and Written Opinion of the International Searching Authority in related International Application No. PCT/EP2022/05223, dated Jul. 13, 2022, 23 pages.

*Primary Examiner* — Nicholas Klicos
(74) *Attorney, Agent, or Firm* — Thompson Patent Law Offices PC

(57) ABSTRACT

The invention relates to a method for controlling an energy production system (1), comprising: —a connecting link (6) provided with a connection (62) to an AC network (2); —a turbine system (3) comprising an electric machine (31) for delivering a nominal electrical power Pnom; —an energy storage system (14), comprising the following steps; —receipt of a first electrical power setpoint Ps0 and control of the turbine system (3) so as to deliver an electrical power Pt0=Ps0; and—receipt of an electrical power setpoint Ps1, where $\Delta Ps=Ps1-Ps0$ and $|\Delta Ps|>Pnom*0.3$; a) application of a hydraulic setpoint to the turbine system (3) so as to increase the delivered electrical power Pti thereof and pre- (Continued)

vent the storage system (14) from delivering electrical power (62); b) determination of the power Pea that the storage system (14) is able to supply; c) when Pti+Pea≥Ps1−ε1, the storage system (14) delivers an electrical power Pe1 to satisfy the requirement Ps1−ε1≤Pe1+Pti≤Ps1+ε2.

22 Claims, 8 Drawing Sheets

(56) References Cited

U.S. PATENT DOCUMENTS

| | | | |
|---|---|---|---|
| 2014/0324237 A1* | 10/2014 | Oe | G06Q 10/06 |
| | | | 700/287 |
| 2016/0237983 A1 | 8/2016 | Hayman | |
| 2017/0192445 A1* | 7/2017 | Dennis | G05F 1/67 |
| 2019/0066236 A1* | 2/2019 | Wenzel | G06Q 10/20 |
| 2019/0087762 A1* | 3/2019 | Ranjan | G06Q 50/06 |
| 2022/0307471 A1* | 9/2022 | Skjelmose | G05B 19/042 |

* cited by examiner

[Fig. 1]
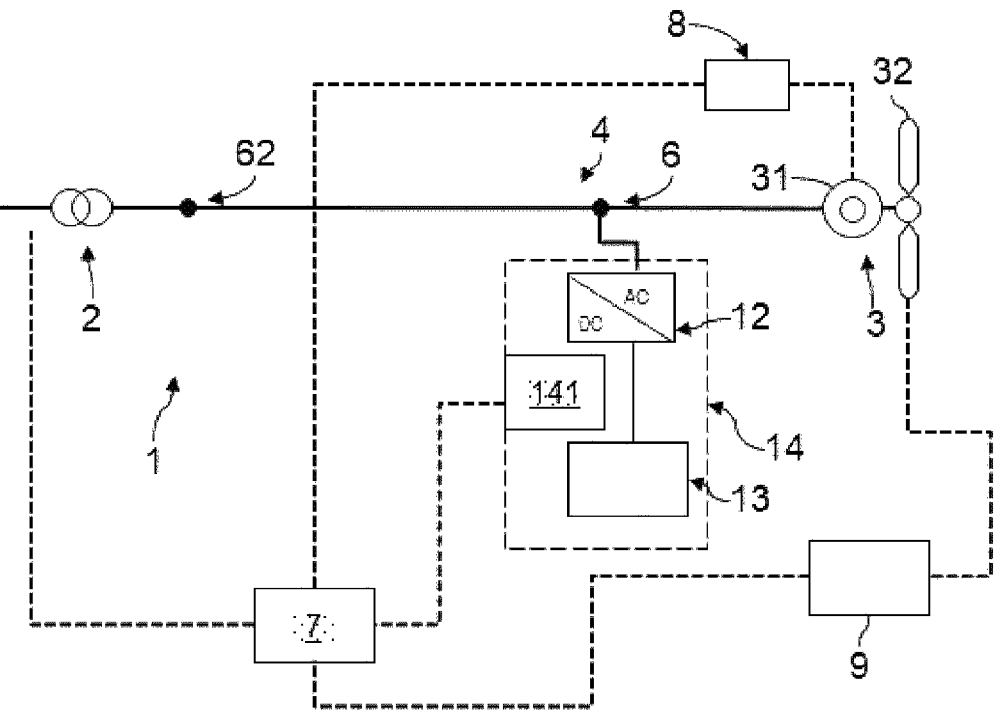
[Fig. 2]
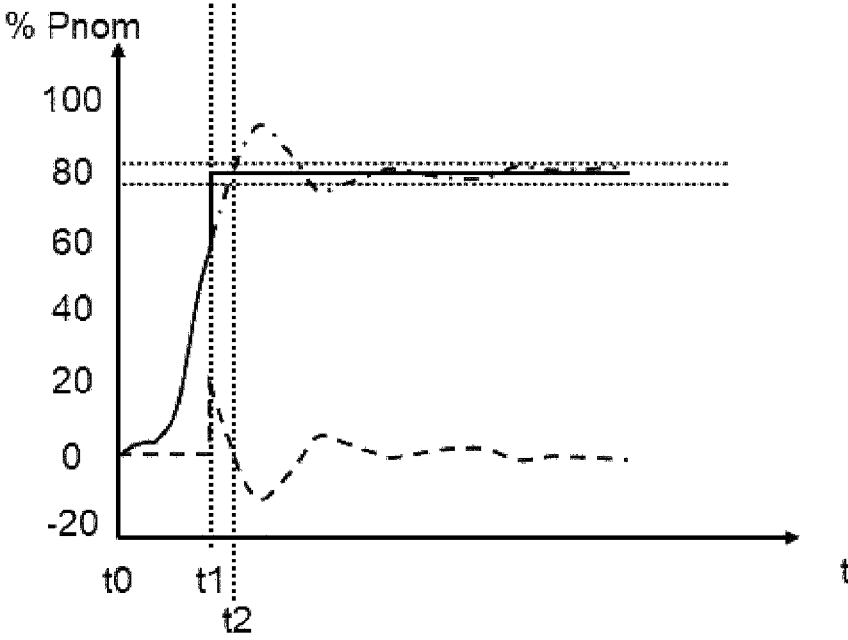

[Fig. 3]
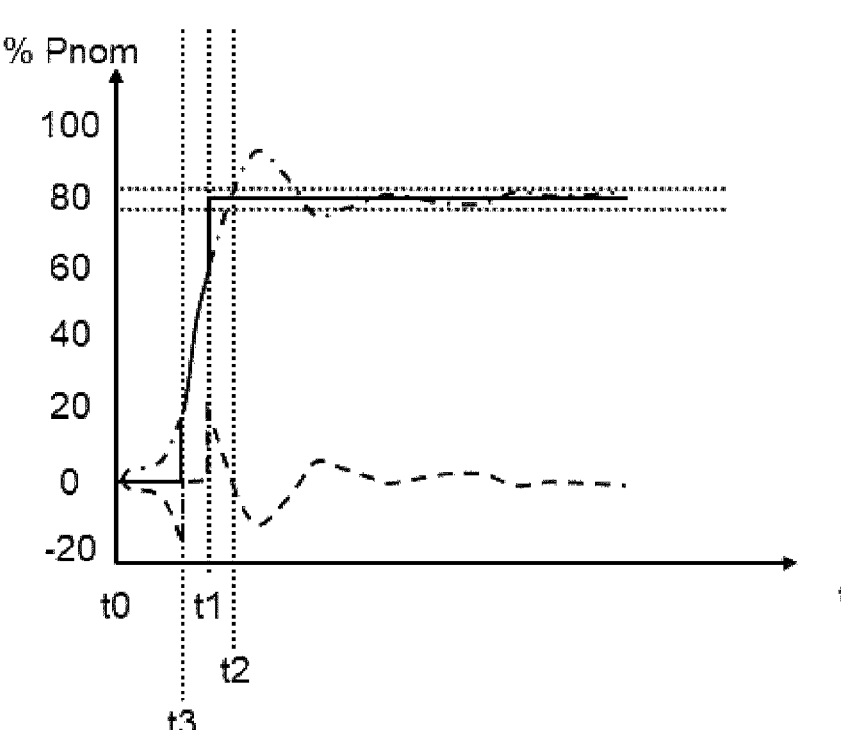

[Fig. 4]
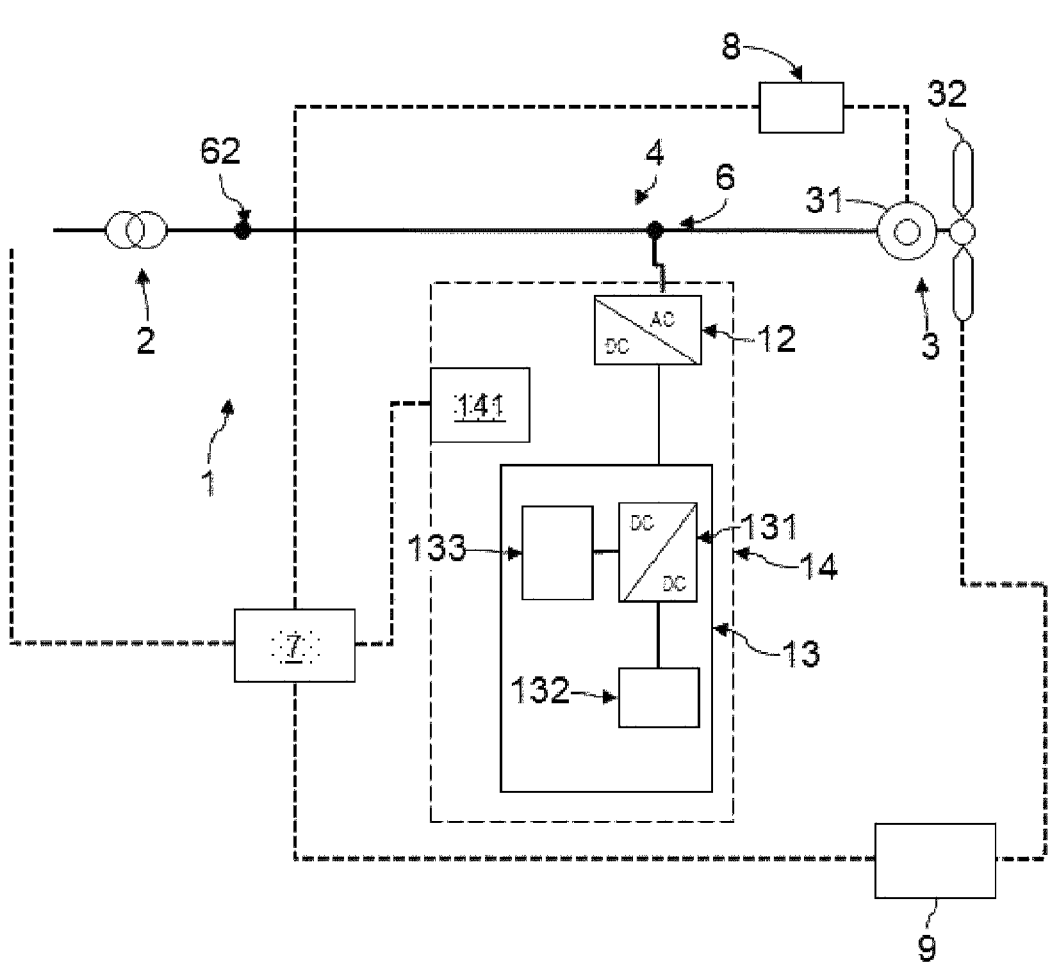

[Fig. 5]
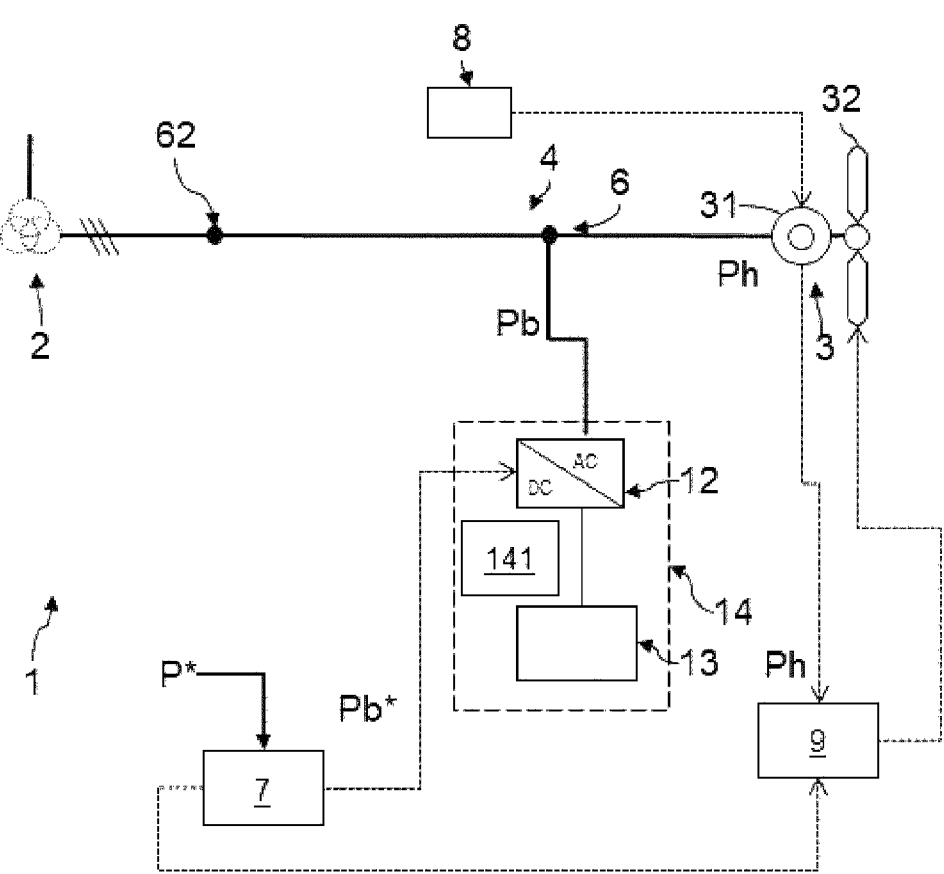

[Fig. 6]

[Fig. 7]
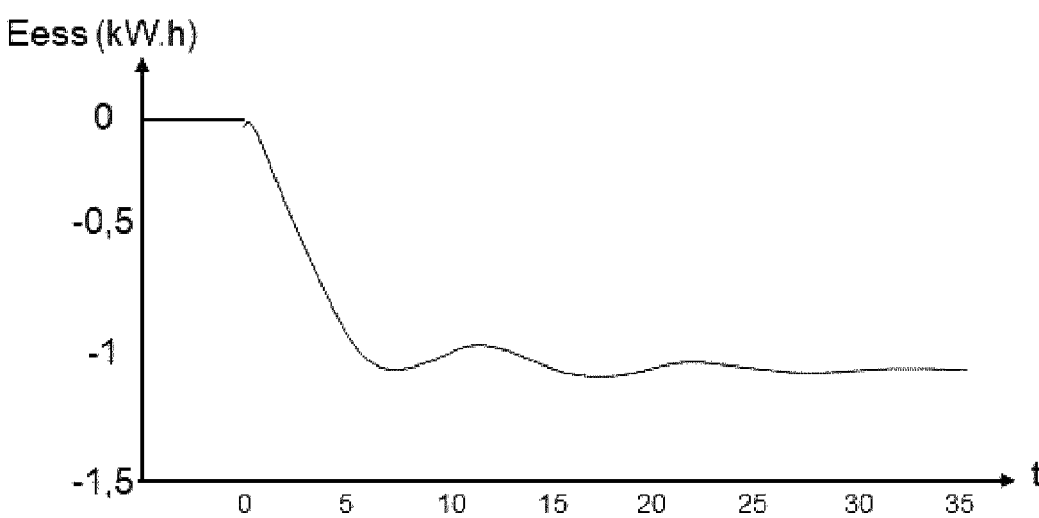

[Fig. 8]

[Fig. 9]
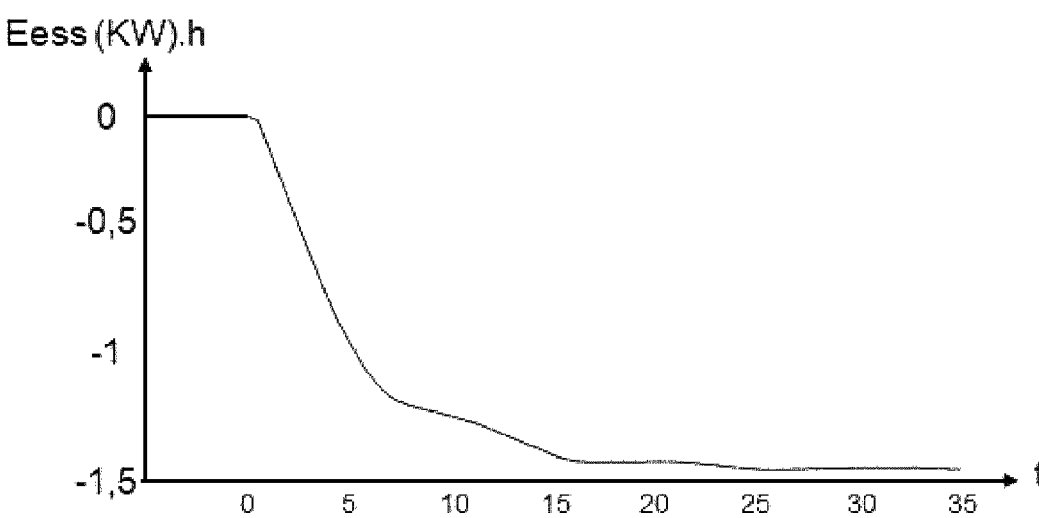

WATER TURBINE POWER GENERATION SYSTEM AND CONTROL METHOD FOR PROVIDING IMPROVED DYNAMIC RESPONSE TO MAJOR POWER SETPOINT VARIATIONS

CROSS-REFERENCE TO RELATED APPLICATIONS

This application is a national stage entry of and claims the benefit of International Application Serial No. PCT/EP2022/052233, titled "Water turbine power generation system and control method for providing improved dynamic response to major power setpoint variations," filed by SUPERGRID INSTITUTE on Jan. 31, 2022, which application claims the benefit of French Application Serial No. FR2100947, filed on Feb. 1, 2021, and of French Application Serial No. FR2200640, filed on Jan. 25, 2022.

This application incorporates the entire contents of the foregoing application(s) herein by reference.

The invention relates to a monitoring strategy for optimising the operation of a hybrid power generation system using a turbine system generating electrical power to an alternating current grid (AC grid), as a primary source of power, and an energy storage system, as a secondary source. The invention relates in particular to the management of significant variations in the electrical power setpoint. The invention also relates to the management of sudden variations in the electrical power setpoint Many electric power plants, particularly hydroelectric dams, include a turbine system for generating electrical power that is transferred to an AC grid via a feeder link. Significant variations in electrical power may be requested by the AC grid manager from the power generation system. Due to its physical limitations, the turbine system cannot deliver a significant variation in electrical power output instantaneously. For example, the responsiveness of a hydraulic system to a significant variation in the power setpoint is generally greater than 30 seconds, particularly given the inertia of the water column in the upstream pipes connected to the turbine.

A water turbine system is configured to operate over a specific output power range. Outside this output power range, several undesirable phenomena can be expected. For example, with a Francis turbine, an instability of the system called "S-shape" appears for an output power between 0% and 20% of the nominal output power, an unstable vortex appears between the turbine blades for an output power between 20% and 40% of the nominal output power, a helical vortex may appear downstream of the turbine for an output power between 40% and 60% of the nominal output power and a straight vortex downstream of the turbine may appear for an output power between 90 and 110% of the nominal output power. These undesirable phenomena are known to damage parts of the turbine system and prolonged use of the system under these conditions forces operators to repair the damaged parts, resulting in increased system interruptions for maintenance and, consequently, increased maintenance costs.

The hydraulic system may be associated with an energy storage system connected to the feeder link to increase the responsiveness of the turbine system to a new electrical power setpoint provided by an AC grid operator. A control circuit receives an electrical power setpoint sent by the AC grid manager and, based on this setpoint, controls a transient power transfer between the feeder link and the energy storage system by selectively controlling the charging or discharging of the energy storage system. When a new setpoint is received, the energy storage system contributes to this variation by immediately participating in the power variation with the turbine.

However, given its cost, the energy storage system has a limited capacity. As a result, it can only contribute to a limited variation in electrical power after a new electrical power setpoint has been transmitted by the AC grid operator. As a result, the actual electrical power supplied to the AC grid does not reach the setpoint requested by the AC grid operator quickly enough. Indeed, responsiveness to a variation in power setpoint has an increasing market value within the context of integrating more renewable energies into electricity grids. This market value increases the profitability of the turbine system, if this responsiveness can be improved.

It is therefore necessary to improve the responsiveness of a power generation system using a turbine system in order to respond to a new electrical power setpoint involving a significant power variation.

On the other hand, electrical power suppliers can derive revenue from system operator requirements. These needs are defined in the form of requests to supply energy to a grid, requests which sometimes require very short activation times, typically less than 1 sec. Such power requests can be made in order to compensate for the difference between production and consumption at the grid level. Such services can generate significant revenue for electricity suppliers if these output power adjustment times are adhered to.

The hydraulic system may be associated with an energy storage system to increase the responsiveness of the turbine system when a new electrical power setpoint is applied. A control circuit receives an electrical power setpoint transmitted by the AC grid operator or calculated based on the difference in frequency observed at the electrical delivery connection, and, depending on this setpoint, controls a transient power transfer between the feeder link and the energy storage system by selectively controlling the charging or discharging of the energy storage system. When such a sudden new setpoint is received, the energy storage system contributes to this variation by immediately contributing to the power variation with the turbine.

However, such a system currently relies on an energy storage system with a high capacity, which increases its cost and overall dimensions. To improve the dissemination of power generation systems that include an energy storage system, it is important to keep their cost as low as possible.

The invention aims to overcome one or more of these drawbacks. The invention therefore relates to a method for controlling a power generation system, as defined in the appended claims.

The invention also concerns variants of the dependent claims. A person skilled in the art will understand that each of the characteristics of the dependent claims or of the description may be combined independently with the characteristics of an independent claim, without this constituting an intermediate generalisation.

Further characteristics and advantages of the invention will become clearer from the following description, which is indicative and not restrictive, with reference to the attached drawings, in which:

FIG. 1 is a schematic representation of a power generation system according to an embodiment of the invention;

FIG. 2 is a diagram illustrating the evolution of the electrical powers at different locations of a power generation system according to a first variant of the invention;

FIG. 3 is a diagram illustrating the evolution of the electrical powers at different locations of a power generation system according to a second variant of the invention;

FIG. 4 is a schematic representation of a power generation system according to another embodiment of the invention;

FIG. 5 is a schematic representation of a power generation system according to another embodiment of the invention;

FIG. 6 illustrates the electrical power supplied at the connection interface with power management according to the invention;

FIG. 7 illustrates the energy supplied by the energy storage device during the power management in FIG. 6;

FIG. 8 illustrates the electrical powers supplied at the connection interface according to a reference power management;

FIG. 9 illustrates the energy supplied by the energy storage device during the power management in FIG. 8.

FIG. 1 is a schematic representation of a power generation system 1 according to a first embodiment of the invention. The power generation system 1 comprises a turbine system 3, an energy storage system 14 and a feeder link 6. The invention will be disclosed in the specific example of a water turbine system, but can also be applied to other turbine systems, such as gas turbines.

The turbine system 3 comprises an electrical machine 31 (generally a synchronous machine) and a turbine 32 coupled to the electrical machine 31. The turbine system 3 is essentially designed to supply electrical power to the feeder link 6. The turbine system 3 can also be reversible and designed to operate as a pump-turbine.

The feeder link 6 comprises a connection interface 62 for an AC grid 2. The electrical machine 31 and the energy storage system 14 are electrically connected to the feeder link 6. The electrical machine 31 is configured to generate electrical power and transfer it to the AC grid 2 via the connection interface 62.

The energy storage system 14 is configured to supply or absorb electrical power to/from the connection interface 62. In this embodiment of the invention, the energy storage system 14 comprises an AC/DC electrical transducer 12 and a DC converter 13. The AC interface of the AC/DC converter 12 is connected to the feeder link 6 and the DC interface of the AC/DC converter 12 is connected to the DC electrical transducer 13 which enables power transfer between the feeder link 6 and the DC transducer 13. [0026] The connection interface 6 is connected to an AC grid 2, typically a three-phase AC grid. The AC grid 2 can request electrical power by providing corresponding power setpoints to the power generation system 1.

The operation of the power generation system 1 is governed by a control system. The control system in the example shown comprises a main supervisor 7, a controller 8 for the electrical machine 31, a controller 141 for the energy storage system and a controller 9 for the turbine 32.

According to the invention, the power generation system 1 is controlled as follows. The following parameters will be used in the remainder of the description.

Pnom is the nominal electrical power of the turbine system 3;

Ps0 is an initial setpoint for the electrical power received from the AC grid 2;

Ps1 is a subsequent electrical power setpoint received from the AC grid 2;

$\Delta ps = Ps1 - Ps0$ corresponds to the variation in electrical power required by the AC grid 2;

Pt0 is the initial electrical power supplied by the turbine system 3 to the connection interface 62;

Pti is the instantaneous electrical power supplied by the turbine system 3;

Pea is the electrical power that the energy storage system can supply to the connection interface 62;

Peamax is the maximum electrical power exchanged at the connection interface 62 by the energy storage system 14, as permitted by the design of the energy storage system 14;

Pe1 is the instantaneous electrical power exchanged between the connection interface 62 and the energy storage system 14;

$\epsilon1$ and $\epsilon2$ are respectively the lower and upper power deviations tolerated by the AC grid 2;

The following steps are carried out. Firstly, before a reference time t=0, the AC grid 2 operates with an electrical power setpoint Ps0 sent by the supervisor 7 to the turbine system 3. At this point, the power Ps0 delivered by the turbine system 3 to the connection interface 62 is equal to the electrical power setpoint Ps0, i.e. PtO=Ps0.

At time t=0, the AC grid 2 provides a subsequent power setpoint Ps1. The corresponding power setpoint Ps1 is received by the supervisor 7, for example. The setpoint Ps1 involves a significant power variation, i.e. it meets the following requirements $\Delta Ps = Ps1 - Ps0$ and $|\Delta Ps| > Pnom*0.3$.

The power variation implied by the setpoint Ps1 is either a power increase (Ps1>Ps0) or a power decrease (Ps0>Ps1). In both cases, the responsiveness of the power Pti is not immediate.

For an increase in power (Ps1>Ps0):

a) a hydraulic setpoint is applied to the turbine system 3, in order to increase its output power Pti at the connection interface 62. The supervisor 7 can, for example, send a hydraulic power setpoint to the controller 9. The controller 9 can control the operation of the turbine 32 accordingly, for example by adapting the angle of the moving blades of the guide in a Francis turbine. The energy storage system 14 cannot supply electrical power simultaneously to the connection interface 62. In this way, the energy stored in the energy storage system 14 is preserved for future use;

b) the power Poa is determined. Poa is the maximum power that the energy storage system 14 can supply to the connection interface 62. In particular, the power Poa can be supplied to the supervisor 7 by a state-of-charge controller of the energy storage system 14;

c) the following requirement is verified: $Pti + Pea \geq Ps1 - \epsilon1$. The supervisor 7 can check this requirement recurrently. When this requirement is met, the energy storage system 14 is controlled to supply the electrical power Pe1 to the connection interface in order to fulfil the requirement $Ps1 - \epsilon1 \leq Pe1 + Pti \leq Ps1 + \epsilon2$, with the power deviations 91 and $\epsilon2$ tolerated by the AC grid 2.

The power Pe1 may initially be equal to Pea or at least equal to Pea/2, or preferably at least equal to Pea*0.75. The power Pe1 may initially be greater than 0.05*Pnom or even initially greater than 0.1*Pnom.

For a decrease in power (Ps0>Ps1):

n) a hydraulic setpoint is applied to the turbine system 3, in order to reduce its output power Pti at the connection interface 62. The supervisor 7 can, for example, send a hydraulic power setpoint to the controller 9. The energy storage system 14 cannot retrieve electrical power simultaneously from the connection interface 62. In this way, the storage capacity of the energy storage system 14 is preserved for future use;

o) the power Poa is determined. The power Poa is the maximum power that the energy storage system 14 can retrieve from the connection interface 62. In particular, the power Poa can be supplied to the supervisor 7 by the controller 141 of the energy storage system 14;

p) the following requirement is verified: Pti+Pea≤Ps1+ε2. The supervisor 7 can check this requirement recurrently. When this requirement is met, the energy storage system 14 is controlled to retrieve the electrical power Pe1 from the connection interface in order to fulfil the requirement Ps1−ε1≤Pe1+Pti≤Ps1+ε2.

According to the invention, the updated setpoint Ps1 can be reached more quickly without requiring increased energy capacity for the energy storage system 14. The invention overturns a prejudice of a person skilled in the art: it teaches to delay the power input of the energy storage system 14 in order to reach the new power setpoint more quickly. The invention is particularly effective if ΔPs>Pnom*0.4, and even more so if ΔPs>Pnom*0.5. The invention is of particular benefit if ΔPs≥2*Peamax.

According to the invention, the turbine 32 can be controlled more dynamically, since the use of the energy storage system 14 allows the electrical power generated by the electrical machine 31 to be temporarily exceeded once the updated setpoint Ps1 is reached. In fact, rapid convergence of Pti with Ps1 as the limit is less necessary; oscillations in power Pti around the setpoint Ps1 are tolerated. The turbine 32 can therefore only be controlled based on its physical requirements. The turbine system 3 can thus provide a change in electrical power in less time.

In addition, controlling the turbine 32 to achieve an overshoot also enables the state of charge of the energy storage system 14 to be addressed after it has been discharged, when the requirement Ps1−ε1≤Pe1+Pti≤Ps1+ε2 is fulfilled.

Such control of the turbine 32 can be expressed as follows. When the requirement Ps1−ε1≤Pe1+Pti≤Ps1+ε2 is fulfilled, the turbine system 3 supplies electrical power Pti transiently to the connection interface 62 where Pti>Ps1 if Ps1>Ps0, or Pti<Ps1 if Ps0>Ps1. The electrical power Pti can transiently correspond to the following relationships: Pti>Ps1 if Ps1>Ps0 or Pti<Ps1 if Ps0>Ps1.

A major overshoot may be accepted when the requirement Ps1−ε1≤Pe1+Pti≤Ps1+ε2 is fulfilled, for example:

if Ps1>Ps0, Pti>Ps1+0.1*Pnom, or

Pti>Ps1+0.15*Pnom, or Pti>Ps1+0.2*Pnom;

if Ps0>Ps1, Pti<Ps1−0.1*Pnom, or Pti>Ps1−0.15*Pnom, or again

Pti>Ps1−0,2*Pnom.

Once the requirement Ps1−ε1≤Pe1+Pti≤Ps1+ε2 has been fulfilled, the operator of the AC grid 2 can be informed that the power setpoint Ps1 has been reached.

The power deviations ε1 and ε2 are set by the operator of the AC grid 2, in order to define the tolerance to power deviations at the connection interface 62. These deviations can, for example, fulfil the requirements ε1≤0.02*Pnom and ε2≤0.02*Pnom, preferably the control method according to claim 1, where ε1≤0.015*Pnom and if possible where ε2≤0.015*Pnom, and ε1≤0.01*Pnom and ε2≤0.01*Pnom.

To reduce the cost of the energy storage system 14, it may, for example, be designed so that Peamax<0.2*Pnom, or be designed so that Peamax<0.15*Pnom.

In some cases, the energy stored in the energy storage system 14 is either insufficient or not high enough to fulfil the updated setpoint requirement for a long period of time. For example, for a power increase Ps1>Ps0, if the energy stored in the energy storage system 14 is less than Pea*(t2−t1)/2, the requirement Ps1−ε1<Pti≤Ps1+ε2 may not be fulfilled until time t2.

The supervisor 7 can incorporate a digital clone of the turbine system 3 to anticipate its production of electrical power. On the basis of parameters such as the power Pti, the water flow rate, the pressure inside the turbine or in its upstream ducts, the supervisor 7 can use the digital clone of the turbine system 3 and anticipate the evolution of the instantaneous transient electrical power Ptm supplied by the electrical machine 31 over a forecast horizon tp>t2−t0. When it receives the setpoint Ps1, the supervisor 7 can anticipate the instantaneous power Pem=Ps1−Pti that will be supplied by the energy storage system 14 over the forecast horizon tp>t2−t0.

By integrating the signal Pem for a period corresponding to the forecast horizon tp>t2−t0, the supervisor 7 can calculate the power that will be required from the energy storage system 14 over the forecast horizon tp>t2−t0. If the energy currently stored in the energy storage system 14 is less than the calculated energy, the energy storage system 14 will adjust its state of charge accordingly during the interval [t0−t1].

If the energy storage system 14 does not have the capacity to store the calculated power, the supply of power by the energy storage system 14 can be postponed to allow the Pti to continue to rise slightly until the energy storage system 14 can supply the calculated power.

This can be applied in the same way for a reduction in the power setpoint.

In the embodiments of the invention, the energy storage system 14 may comprise a storage device selected from the group consisting of a supercapacitor, a fuel cell, an electrochemical battery, an electric motor driving a flywheel, an air compressor and an electromagnetic storage.

FIG. 2 illustrates the operation of a power generation system 1 according to an embodiment of the invention. The solid line curve corresponds to the overall electrical power supplied to the connection interface 62. The dotted and dashed curve corresponds to the electrical power supplied by the electrical machine 31 to the connection interface 62. The dotted curve corresponds to the electrical power exchanged between the energy storage system 14 and the connection interface 62. The upper limit corresponds to Ps1+ε2; the lower limit corresponds to Ps1−ε2.

In this example, Pt0=Ps0=0, i.e. the turbine system 3 does not supply power to the connection interface 62 until t=0. At this stage, the state of charge of the energy storage system 14 is sufficient for it to supply electrical power Poa to the connection interface 62, in accordance with the invention. The energy storage system 14 can be fully or partially charged.

When t=0, the AC grid 2 sends the power setpoint Ps1 to the supervisor 7, where Ps1=0.8*Pnom. As a result, a significant increase in power is required by the AC grid 2. Until t=t1, the energy storage system 14 cannot supply electrical power to the connection interface 62. The energy storage system 14 cannot exchange electrical power with the connection interface 62 until t1. Thus, Pe1=0 between t=0 and t1. Until t=t1, the turbine system 3 is controlled to increase the electrical output power Pti at the connection interface 62. Until t=t1, Pti+Pea<Ps1. As a result, the electricity generation system 1 is unable to supply the electrical power corresponding to Ps1 until t1. Until t=t1, the electrical power for the connection interface 62 is supplied solely by the turbine system 3.

When t=t1, the requirement Pti+Pea≥Ps1 is fulfilled and the state of charge of the energy storage system is sufficient to ensure continued operation. The energy storage system 14 is subsequently controlled to supply the electrical power Pe1 with $Ps1-\varepsilon1\leq Pe1+Pti\leq Ps1+\varepsilon2$. Owing to its power contribution, the energy storage system 14 enables the power setpoint Ps1 to be reached quickly.

The energy storage system 14 is used to meet this requirement, even after it has been fulfilled. As shown in FIG. 2, dynamic control of the turbine 32 results a power overshoot after t=t2: Pti>Ps1. Thus, after t2, the energy storage system 14 begins to retrieve electrical power from the connection interface 42, in order to maintain $Ps1-\varepsilon1\leq Pe1+Pti\leq Ps1+\varepsilon2$. The previous discharge of the energy storage system 14 enables it to store more electrical power after such an overshoot.

As shown in FIG. 2, after t1, the electrical power Pti can oscillate around the setpoint Ps1. The energy storage system 14 compensates for these fluctuations in order to maintain the power delivered to the connection interface 62 within the limits set by the operator of the AC grid 2. Consequently, the energy storage system 14 sequentially retrieves/distributes energy from/to the AC grid 2.

FIG. 3 illustrates the operation of a power generation system 1 according to another embodiment of the invention. The solid line curve corresponds to the overall electrical power supplied to the connection interface 62. The dotted and dashed curve corresponds to the electrical power supplied by the electrical machine 31 to the connection interface 62. The dotted curve corresponds to the electrical power exchanged between the energy storage system 14 and the connection interface 62. The upper limit corresponds to Ps1+ε2; the lower limit corresponds to Ps1−ε2.

In this example, Pt0=Ps0=0, i.e. the turbine system 3 does not supply power to the connection interface 62 until t=0. At this stage, the energy storage system 14 can be fully or partially charged.

When t=0, the AC grid 2 sends the power setpoint Ps1 to the supervisor 7, where Ps1=0.8*Pnom. As a result, a significant increase in power is required by the AC grid 2. Until t=t1, the energy storage system 14 retrieves electrical power from the connection interface 62, in order to process its state of charge for further operation.

Until t=t1, the turbine system 3 is controlled to increase the electrical output power Pti at the connection interface 62. Until t=t1, Pti+Pea≤Ps1. As a result, the electricity generation system 1 is unable to supply the electrical power corresponding to Ps1 until t1.

Until t=t3, the electrical power supplied by the turbine system 3 to the connection interface 62 is retrieved by the energy storage system 14. Therefore, until t3, no electrical power is supplied to the connection interface 62; all the available electrical power Pti is transferred to the energy storage system 14. This does not cause any problems for management of the AC grid 2, as there is not enough power available to reach the setpoint Ps1.

When t=t3, the energy stored in the energy storage system 14 has reached an adequate value for continued operation. Between t3 and t1, there is no exchange of power between the energy storage system 14 and the connection interface 62. The electrical power supplied to the connection interface 62 therefore corresponds to the electrical power supplied by the turbine system 3 to this interface 62.

When t=t1, the requirement Pti+Pea≥Ps1−ε1 is fulfilled. The energy storage system 14 is subsequently controlled to supply the electrical power Pe1 with $Ps1-\varepsilon1\leq Pe1+Pti\leq Ps1+\varepsilon2$. Owing to its power contribution, the energy storage system 14 enables the power setpoint Ps1 to be reached quickly. The behaviour of the electricity generation system 1 is then identical to the behaviour disclosed for the embodiment shown in FIG. 2.

The following control parameters can be used. The supervisor 7 can receive active/reactive power setpoints from the AC grid 2. The supervisor 7 will set the respective power inputs of the energy storage system 14 and the hydraulic system 3, providing them with corresponding setpoints. The supervisor 7 can send the respective setpoints to the controllers 141, 8 and 9. The supervisor 7 can also transmit additional information, for example the voltage value of the AC grid 2 to the controllers 141 and 8.

The controller 9 can receive the value of the instantaneous power Pti supplied by the electrical machine 31 to the connection interface 62, in order to correct the control of the water turbine 32.

The AC/DC converter 12 is configured to be current-reversible. The AC/DC converter 12 is controlled by the controller 141.

FIG. 4 is a schematic representation of a power generation system 1 according to a second embodiment of the invention. This embodiment is identical to the second, except for the structure of its energy storage device 14. In this embodiment, the DC electrical transducer 13 of the energy storage system 14 comprises an DC/DC converter 131 and an electrical power storage device 132. The DC/DC converter 131 electrically connects the energy storage system 14 to the DC interface of the AC/DC converter 12. The DC/DC converter 131 is configured to adapt the voltage level between the storage device 132 and the DC interface of the AC/DC converter 12. The operation of the electrical transducer 13 can be controlled by a control circuit 133.

FIG. 5 is a schematic representation of a power generation system 1 according to another embodiment of the invention, according to an independent aspect of this invention. The power generation system 1 comprises a turbine system 3, an energy storage system 14 and a feeder link 6. The invention will be disclosed in the specific example of a water turbine system, but can also be applied to other turbine systems, such as gas turbines.

The turbine system 3 comprises an electrical machine 31 (generally a synchronous machine) and a turbine 32 coupled to the electrical machine 31. The turbine system 3 is essentially designed to supply electrical power to the feeder link 6. The turbine system 3 can also be reversible and designed to operate as a pump-turbine.

The feeder link 6 comprises a connection interface 62 for an AC grid 2. The electrical machine 31 and the energy storage system 14 are electrically connected to the feeder link 6. The electrical machine 31 is configured to generate electrical power and transfer it to the AC grid 2 via connection interface 62.

The energy storage system 14 is configured to supply or absorb electrical power to/from the connection interface 62. In this embodiment of the invention, the energy storage system 14 comprises an AC/DC electrical transducer 12 and a DC converter 13. The AC interface of the AC/DC converter 12 is connected to the feeder link 6 and the DC interface of the AC/DC converter 12 is connected to the DC electrical transducer 13 which enables power transfer between the feeder link 6 and the DC transducer 13.

The connection interface 6 is connected to an AC grid 2, typically a three-phase AC grid. The AC grid 2 can request electrical power by providing corresponding power setpoints to the power generation system 1.

The operation of the power generation system 1 is controlled by a control system. The control system in the example shown comprises a main supervisor 7, a controller 8 for the electrical machine 31, a controller 141 for the energy storage system and a controller 9 for the turbine 32.

According to this embodiment of the invention, the power generation system 1 is controlled as follows.

The controller 9 is configured to apply a setpoint of a fluid parameter to the turbine 32, whereby this parameter influences the electrical power supplied by the electrical machine 31. More specifically, for a water turbine 32, the fluid parameter setpoint may be a turbine 32 guide valve opening setpoint. The electrical machine 31 thus supplies instantaneous electrical power Ph to the feeder link 6.

The controller 7 receives from the AC grid 2 a setpoint P* to be delivered to the connection interface 62 (the setpoint P* may also be calculated locally by the controller 7, for example by taking account of frequency variations). Before time t=0, the value of the setpoint P* is Ps0. The turbine system 3 is therefore controlled to deliver a power Ph0=Ps0 to the connection interface 62. The energy storage system 14 is therefore not used, or can be charged or used temporarily.

At time t=0, the value of the setpoint P* is Ps1. ΔPs=Ps1−Ps0, where Ps1>Ps0. Hence, at time t=0, a sudden increase in the setpoint value P* is requested.

On the basis of a predictive control model of the electrical power generated by the turbine system 3, successive operating parameters of the turbine controller 9 are determined, so that the power Ph reaches the value Ps1 with a minimum amount of additional energy to be supplied by the energy storage system 14. Thus, the controller 7 sends successive hydraulic power setpoints Ph* to the turbine controller 9 until the system reaches equilibrium. The controller 7 also sends successive power setpoints Pb* to the energy storage system 14 until the system reaches equilibrium. The power setpoints are defined to follow the relationship Ph*+Pb*=Ps1.

Model predictive controllers (MPCs) are based on dynamic models of a process, usually linear empirical models obtained by identifying a system. The models used in model predictive controllers are generally intended to represent the behaviour of complex dynamic systems. Model predictive controllers are based on finite-horizon iterative optimisation under the constraints of a system model. At time t, the current state of the system is sampled and a cost-minimising control strategy is calculated (using a numerical minimisation algorithm) for a relatively short time horizon into the future: [t, t+T], where t is the current time and T is the prediction time or prediction horizon. More specifically, an online or on-the-fly calculation is used to explore the state trajectories emanating from the current state and to determine (via the solution of the Euler-Lagrange equations, for example) a cost-minimising control strategy up to time t+T. Only the first stage of the control strategy is implemented over time [t, t+Ts], Ts being the sampling time of the controller; then the state of the system is sampled again, and the calculations are repeated from the new current state, giving a new control and a new predicted state path. The prediction horizon continues to be shifted into the future and for this reason, model predictive controllers are also known as runaway horizon controllers.

Until the hydraulic system stabilises at the target output power (Ph reaches Ps1), the energy storage system 14 applies an actual electrical power Pb to the feeder link 6, where Pb+Ph=Ps1. At the same time, the successive operating parameters supplied by the turbine controller 9 are applied to the turbine 32.

Typically, the successive operating parameters determined by the controller 7 are power setpoints for the turbine 32. These setpoints are determined by the model predictive control, by minimising a cost function defined as the amount of additional energy to be supplied to the turbine over the prediction horizon to meet the high-level requirements associated with the new power setpoint. As a secondary objective, the same method is used for slaving of the state of charge of the energy storage system 14. The calculation of the best set of operating parameters for the turbine controller 9 also includes the following constraints: i) the additional energy to be supplied must not be greater than that which the energy storage system 14 can absorb (or supply) according to its actual state of charge, ii) the predicted additional power must not be greater than that which the energy storage system 14 can absorb (or supply) according to its actual state of health; ii) the stability margins of the turbine system 3 and its controller 9 must be respected.

Figure 6:
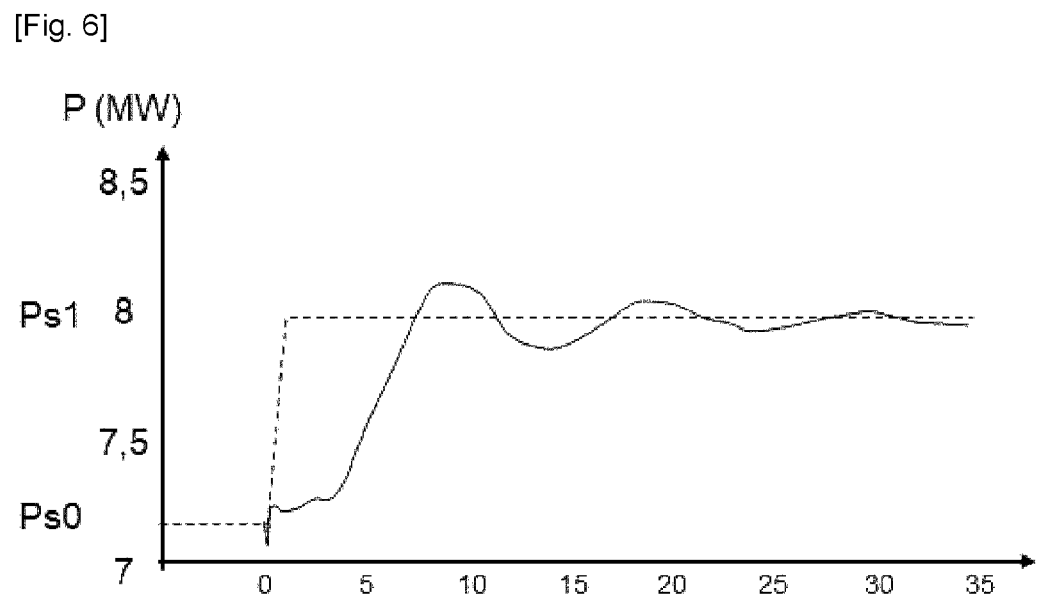

FIG. 6 illustrates corresponding powers applied to the connection interface 62 according to the invention. FIG. 6 illustrates in a dotted line the overall electrical power supplied to the connection interface 62. The hydraulic power Ph supplied on the connection interface 62 is shown as a solid line. FIG. 7 illustrates the amount of energy to be delivered by the energy storage device 14 over the same period (corresponding to the area between the solid and dotted lines in FIG. 6). As can be seen, the energy supplied by the energy storage device 14 until Ph reaches Ps1 is approximately 1 kW·h, for example.

Figure 8:
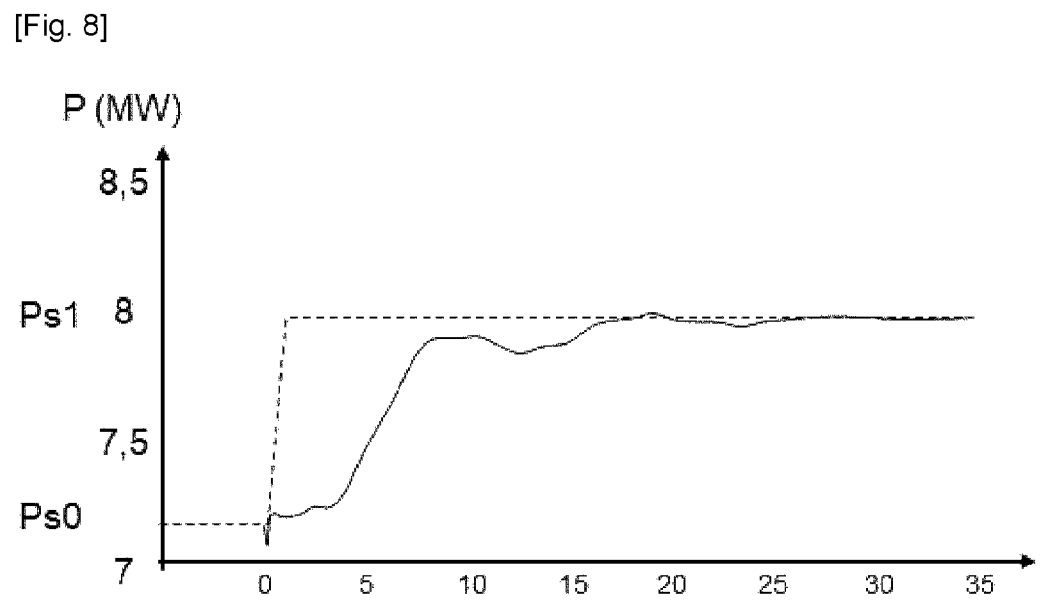

FIG. 8 shows as a dotted line the overall electrical power supplied at the connection interface 62 for a reference power management. According to this state-of-the-art power management, the turbine 32 is controlled to provide a hydraulic power Ph that remains lower than Ps1. The hydraulic power Ph supplied on the connection interface 62 is shown as a solid line. FIG. 9 illustrates the amount of energy to be delivered by the energy storage device 14 during the same energy management period. As can be seen, the energy supplied by the energy storage device 14 until Ph reaches Ps1 is approximately 1.5 kW·h.

Consequently, according to the invention, the energy required from the energy storage device 14 is reduced. In this way, an energy storage device 14 with a reduced capacity (and therefore a lower cost and smaller overall dimensions) can be used.

To ensure that the energy storage device 14 is able to supply the required energy to the connection link 6, the controller 7 also determines the amount of additional energy Emin that the energy storage system 14 must supply to the connection link 6 to meet the requirement Ps1=Pb+Ph up to Ph=Ps1. The electrical power satisfying the requirement Pb+Ph=Ps1 and the application of the determined successive operating parameters of the turbine 32 are triggered only when the instantaneous available energy of the energy storage system 14 fulfils Eess>Emin.

Depending on the requirements set by the grid managers, the electrical power meeting the requirement Pb+Ph=PS1 and the application of the determined successive operating parameters of the turbine 32 are triggered less than 5 secs after reception of the electrical power setpoint Ps1, preferably less than 2 secs, preferably less than 1 sec, preferably less than 500 msecs, and preferably less than 300 msecs.

According to another variant of this embodiment of the invention, the power generation system 1 is controlled as follows. In this embodiment, the turbine controller 9 is a PID controller, having at least one variable gain (either one or more among a proportional gain, an integration gain and a derivative gain).

As for the previous variant, the turbine controller 9 is configured to apply a fluid parameter setpoint to the turbine 32, influencing the electrical power delivered by the electrical machine 31. The electrical machine 31 thus supplies an instantaneous electrical power Ph to the feeder link 6.

The controller 7 receives from the AC grid 2 a setpoint P* to be delivered to the connection interface 62. Before time t=0, the value of the setpoint P* is Ps0. The turbine system 3 is therefore controlled to deliver a power Ph0=Ps0 to the connection interface 62. The energy storage system 14 is therefore not used, or can be charged or used temporarily.

At time t=0, the value of the setpoint P* is Ps1. ΔPs=Ps1−Ps0, where Ps1>Ps0. Hence, at time t=0, a sudden increase in the setpoint value P* is requested.

From a model predictive control of the electrical power generated by the turbine system 3, successive values of a variable gain of the turbine controller 9 are determined, so that the power Ph reaches the value Ps1 with a minimum amount of complementary energy supplied by the energy storage system 14. Successive values can be determined for several different gains of the turbine controller 9.

The invention claimed is:

1. A method of controlling an electricity generation system (1) comprising:
   - a feeder link (6) comprising a connection interface (62) for connection to an AC grid (2);
   - a turbine system (3) comprising an electrical machine (31) and configured to deliver a nominal electrical power Pnom to the feeder link (6);
   - an energy storage system (14) connected to the feeder link (6), wherein the control method comprises the following steps:
   - receiving from the AC grid (2) a first electrical power setpoint Ps0 to be delivered to the connection interface (62) and controlling the turbine system (3) so as to deliver an electrical power Pt0=Ps0 to the connection interface; and
   - receiving another electrical power setpoint Ps1 from the AC grid (2), where a variation in electrical power ΔPs=Ps1−Ps0 and |ΔPs|>Pnom*0.3;

if $Ps1>Ps0$:
   - a) applying a hydraulic setpoint to the turbine system (3) to increase its electrical power output Pti and prevent the energy storage system (14) from supplying electrical power to the connection interface (62);
   - b) determining a power Poa that the energy storage system 14 can supply to the connection interface;
   - c) when Pti+a power supported by electrical storage system Pea≥Ps1−a lower power deviation ε1, control of the energy storage system (14) in order to supply an electrical power Pel to the connection interface with a view to fulfilling a requirement Ps1−the lower power deviation ε1≤Pel+Pti≤Ps1+a upper power deviation ε2, with the lower power deviations ε1 and the upper power deviation ε2 tolerated by the AC grid (2) at the connection interface (62); or if Ps0>Ps1:
   - n) applying the hydraulic setpoint to the turbine system in order to decrease its electrical power output Pti and prevent the energy storage system (14) from retrieving electrical power from the connection interface;
   - o) determining the power Pea that the energy storage system (14) can retrieve from the connection interface (62);

- p) when Pti+Pea≤Ps1+ε2, controlling the energy storage system (14) to retrieve electrical power Pel from the connection interface with a view to fulfilling the requirement $Ps1-\varepsilon1 \leq Pe1+Pti \leq Ps1+\varepsilon2.$ 2. The control method according to claim 1, wherein $\varepsilon1 \leq 0.02*Pnom$ and $\varepsilon2 \leq 0.02*Pnom.$ 3. The control method according to claim 1, wherein a completion signal is sent to a system for managing the AC grid (2) when the requirement $Ps1-\varepsilon1 \leq Pe1+Pti \leq Ps1+\varepsilon2$ is fulfilled.

4. The control method according to claim 1, wherein the hydraulic setpoint is applied to the turbine system to cause it to deliver electrical power Pti transiently to the connection interface when the requirement $Ps1-\varepsilon1 \leq Pe1+Pti \leq Ps1+\varepsilon2$ is fulfilled, where:

$Pti>Ps1$ if $Ps1>Ps0$; or $Pti<Ps1$ if $Ps0>Ps1.$

5. The control method according to claim 4, wherein, when the requirement Ps1−ε1≤Pe1+Pti≤Ps1+ε2 is fulfilled, the electrical power Pti transiently satisfies the relationship:

$Pti>Ps1+0.1*Pnom$ if $Ps1>Ps0$; or $Pti<Ps1-0.1*Pnom$ if $Ps0>Ps1.$

6. The control method according to claim 4, wherein the energy storage system (14) is controlled to sequentially absorb and supply electrical power to the connection interface when the requirement Ps1−ε1≤Pe1+Pti≤Ps1+ε2 is fulfilled.

7. The control method according to claim 1, wherein:
   - Pe1=0 between the time at which the another electrical power setpoint Ps1 is received and the time at which Pti+Pea−ε1≥Ps1 or between the time at which the setpoint Ps1 is received and the time at which Pti+Pea+ε2≤Ps1.

8. The control method according to claim 1, wherein, between the moment at which the another electrical power setpoint Ps1 is received and the moment at which $Pti+Pea-\varepsilon1 \geq Ps1$, the energy storage system is controlled to:

apply $Pe1<0$ if $Ps1>Ps0$; or apply $Pe1>0$ if $Ps0>Ps1.$

9. A power generation system (1), characterised in that it comprises:
   - a feeder link (6) comprising a connection interface (62) for connection to an AC grid (2);
   - a turbine system (3) comprising an electrical machine (31) and configured to deliver a nominal electrical power Pnom to the feeder link (6);
   - an energy storage system (14) connected to the feeder link (6);
   - a control system (7) configured to control the operation of the power generation system (1), wherein the control system (7) is configured for:
   - receiving from the AC grid (2) a first electrical power setpoint Ps0 to be delivered to the connection interface (62) and controlling the turbine system (3) to deliver an electrical power Pt0=Ps0 to the connection interface; and receiving another electrical power setpoint Ps1 from the AC grid (2), where variation in electrical power $\Delta Ps=Ps1-Ps0$ and $|\Delta Ps|>Pnom*0.3$;

if *Ps1>Ps0*:

a) applying a hydraulic setpoint to the turbine system (3) to increase its electrical power output Pti and prevent the energy storage system (14) from supplying electrical power to the connection interface (62);

b) determining a power Pea that the energy storage system 14 can supply to the connection interface;

c) when Pti+a power supported by electrical storage system Pea≥Ps1–a lower power deviation ε1, controlling the energy storage system (14) to deliver electrical power Pe1 to the connection interface to fulfil a requirement Ps1–the lower power deviation ε1≤Pe1+Pti≤Ps1+an upper power deviation ε2, with the lower power deviation ε1 and the upper power deviation ε2 tolerated by the AC grid (2) at the connection interface (62); or if *Ps0>Ps1*:

n) applying the hydraulic setpoint to the turbine system in order to decrease its electrical power output Pti and prevent the energy storage system (14) from retrieving electrical power from the connection interface;

o) determining the power Pea that the energy storage system (14) can retrieve from the connection interface (62);

p) when Pti+Pea≤Ps1+ε2, controlling the energy storage system (14) to retrieve electrical power Pe1 from the connection interface with a view to fulfilling the requirement

*Ps1–ε1≤Pe1+Pti≤Ps1+ε2.*

10. The power generation system (1) according to claim 9, wherein the energy storage system (14) comprises a direct current electrical transducer (13), an AC/DC converter (12) having an AC interface connected to the feeder link (6) and a DC interface connected to the direct current electrical transducer (13).

11. The power generation system (1) according to claim 10, wherein the energy storage system (14) comprises a DC/DC converter (131) configured to change a voltage level between a DC electrical transducer (132) and the AC/DC converter (12).

12. The power generation system (1) according to claim 11, wherein the DC electrical transducer (13) is selected from the group comprising a supercapacitor, a fuel cell, an electrochemical battery, an electric motor driving a flywheel, an air compressor and an electromagnetic storage.

13. The power generation system (1) according to claim 9, wherein Pe1>Pea/2.

14. A method of controlling an electricity generation system (1) comprising:

a feeder link (6) comprising a connection interface (62) for connection to an AC grid (2);

a turbine system (3) comprising an electrical machine (31), a turbine (32) and a turbine controller (9), wherein the turbine controller is configured to deliver at least one fluid parameter setpoint to the turbine (32) influencing the electrical power delivered by the electrical machine (31), wherein the electrical machine (31) delivers an instantaneous electrical power Ph to the connection link (6);

an energy storage system (14) connected to the feeder link (6);

wherein the control method includes the following steps:

a) receiving a first electrical power setpoint Ps0 to be delivered to the connection interface (62) and controlling the turbine system (3) so as to deliver an electrical power Ph=Ps0 to the connection interface; and b) receiving a subsequent electrical power setpoint Ps1 (2), where variation in electrical power $\Delta Ps=Ps1-Ps0$, where Ps1>Ps0;

c) based on a predictive control model of the electrical power generated by the turbine system (3), determining successive operating parameters of the turbine controller (9) so that the Ph reaches Ps1 with a minimum amount of additional energy;

d) until Ph=Ps1, applying electrical power Pb to the feeder link (6) by means of the energy storage system (14), where Pb+Ph=Ps1, and applying the successive operating parameters to the turbine controller (9).

15. The method of controlling an electricity generation system (1) according to claim 14, wherein the energy storage system (14) has an instantaneous available energy Eess, the method furthermore comprising determination of an additional energy Emin that the electrical power system (14) must supply to the connection link (6) in order to fulfil the condition Ps1=Pb+Ph until Ph=Ps1, wherein step d) is triggered only when Eess>Emin.

16. The method of controlling an electricity generation system (1) according to claim 14, wherein step d) is triggered less than 5 seconds after step b).

17. The method of controlling an electricity generation system (1) according to claim 16, wherein step d) is triggered less than 1 second after step b).

18. The method of controlling an electricity generation system (1) according to claim 14, wherein the successive operating parameters are the turbine operating points, wherein step c) is performed by iteratively evaluating the instantaneous power Ph, by comparing the evaluated instantaneous power Ph with the electrical power anticipated by the model predictive control, determining updated successive operating parameters for the turbine controller (9) so that Ph reaches Ps1 with a minimum amount of additional energy.

19. The method of controlling an electricity generation system (1) according to claim 14, wherein the turbine controller (9) is a PID controller, the successive operating parameters being successive values of at least one gain variable selected from a proportional gain, an integration gain and a derivative gain.

20. The method of controlling an electricity generation system (1) according to claim 14, wherein said turbine (32) is a water turbine, and wherein said fluid parameter setpoint is a guide valve opening setpoint of the water turbine (32).

21. The method of controlling an electricity generation system (1) according to claim 14, wherein the first received electrical power setpoint Ps0 is received from the AC grid (2).

22. The method of controlling an electricity generation system (1) according to claim 14, wherein the first received electrical power setpoint Ps0 is calculated by the power generation system (1).

* * * * *